United States Patent [19]

Boyd et al.

[11] 4,215,383

[45] Jul. 29, 1980

[54] CURRENT REGULATOR FOR DC MOTORS INCLUDING SENSITIVITY CONTROL MEANS THEREFOR

[75] Inventors: Robert L. Boyd, Woodcliff Lake; Joseph W. Fleming, Ramsey, both of N.J.

[73] Assignee: Ramsey Controls, Inc., Rahway, N.J.

[21] Appl. No.: 878,621

[22] Filed: Feb. 16, 1978

[51] Int. Cl.² .................... H01H 47/04; H01H 47/06
[52] U.S. Cl. ................................. 361/210; 318/332; 318/346; 318/520; 335/154; 361/155
[58] Field of Search ............ 318/306, 308, 331, 332, 318/341, 346, 432, 433, 453, 454, 455, 519, 520; 335/151, 153, 154, 155; 361/210, 152, 154, 155, 156

[56] References Cited

U.S. PATENT DOCUMENTS

| | | | |
|---|---|---|---|
| 2,724,081 | 11/1955 | De la Source | 318/332 |
| 3,174,008 | 3/1965 | Mishelevich et al. | 335/154 |
| 3,569,807 | 3/1971 | Ulrich | 318/332 |
| 3,634,794 | 1/1972 | Verbeke | 335/153 |

*Primary Examiner*—David Smith, Jr.
*Attorney, Agent, or Firm*—Mel K. Silverman; Mahendra A. Gandhi

[57] ABSTRACT

The present invention relates to an electrical circuit for current regulation in DC motors including a sensitivity control means therefor. The circuit includes a means for sensing a predetermined current level in the load of a DC motor. In combination therewith is a subcircuit for cutting-off the load current when the predetermined current level has been reached. Additionally, there is provided means for restoring the load current when, after load current cutoff, the inductive motor current has fallen to a level sufficient to restart the subcircuit.

1 Claim, 8 Drawing Figures

CURRENT REGULATOR FOR DC MOTORS INCLUDING SENSITIVITY CONTROL MEANS THEREFOR

BACKGROUND OF THE INVENTION

The prior art in the present field falls generally within three areas, namely, the use of (a) current transformers, (b) voltage control techniques, and (c) variable resistance methods. Most of these are classified in U.S. Class 318, Sub-class 331.

With respect to the use of current transformers, the prior art includes the following:

U.S. Pat. No. 2,754,463 to Hansen which, basically, comprises a motor speed and torque controller.

U.S. Pat. No. 2,765,434 to Dudenhausen which discloses a speed control circuit having little emphasis in the current limiting area.

U.S. Pat. No. 3,295,040 to Schieman. This patent, entitled Current Limit Circuit, discloses the use of a three-phase transformer in conjunction with a DC power supply.

U.S. Pat. No. 3,526,819 to Graf. This patent, entitled Current Limit for Motor Control Systems, utilizes a phase controlled power amplifier in order to sense the point at which the armature current has decreased below a predetermined level, in order to thereby fire a control rectifier within the current limit circuit.

With respect to the use of voltage sensing means in current regulation, the prior art is represented by:

U.S. Pat. No. 3,253,204 to Hudson utilizing various voltage sensing techniques in order to produce an offset current under conditions at which the motor current would otherwise exceed an undesired level.

U.S. Pat. No. 3,583,947, entitled Full Wave Adjustable Motor Speed Control System with Feedback, discloses means for integrating the voltage appearing across the motor armature circuit, that is, balancing out the voltage drop due to the resistance of the motor armature in order to limit current levels.

With respect to the use of variable resistance means, the prior art is represented by the following:

U.S. Pat. No. 2,724,081 to De La Source. This patent utilizes current offset techniques in combination with a variable resistance approach in order to achieve current limitation.

U.S. Pat. No. 2,885,621 to Brown, entitled Current Regulating Circuits for Motor Control. This patent teaches use of a superimposed alternating current component upon a direct current component, together with the use of phase displacement techniques.

U.S. Pat. No. 3,305,720 to Safir. This patent discloses an arrangement of deceleration current amplifiers and deceleration relay coils in order to offset undesired current accelerations.

Other patents of interest in the present field include:

U.S. Pat. No. 3,412,307 to Welsh, entitled Current Limiting Motor Control Circuit. This patent comprises a means for acceleration and deceleration in bi-directional motors.

U.S. Pat. No. 3,551,774 to Rusch. This patent makes use of a voltage across an impedance and, additionally, utilizes voltage spikes as control means. Additionally, thermal sensing is involved.

U.S. Pat. No. 3,710,213 to Hammer, relates to pulse-rate control of motor speed.

U.S. Pat. No. 3,868,554 to Conrad. This patent utilizes temperature sensing by thyristors in order to limit motor current.

It is to be noted that the most common method of regulating load current through a DC motor is to insert a resistance in series with the load. In such a method, the power supply is divided between the load and the series resistor, with the resultant disadvantage of system inefficiency.

The more desirable method of controlling DC motors in DC loads is by voltage control, generally known as average voltage controlling. In this method the DC load voltage is pulsed on and off either by a switch or by a solid state device. The variation and time duration during which the switch is in the on and off positions provide control over the average load, voltage, or motor speed. This system places full voltage across the motor for a set period of time regardless of the turn peaks. The load current, when the motor is stalled or when peak load conditions are present, is limited only by load impedance. In this system, the period of the voltage pulses is usually constant and is set by a multivibrator; the ratio of on to off time therein may be varied through the use of a referenced potentiometer which changes the RC time constant of the vibrator.

Despite the general acceptance of the above method, it is, nonetheless, in many instances, desirable to achieve an absolute regulation of the current flow through the motor in order to achieve not only motor control but to maximize the life of the motor as well as the associated circuitry. Also, lack of sensitivity control in current regulation has been a problem in the multivibrator approach.

Current regulation in DC motors is particularly important in the field of vehicle drive in which regulation of the current drawn from the battery must be subject to precise control. Additionally, current regulation is necessary in order to achieve accurate torque.

The present invention may be viewed as response to problems of motor heating and battery drain which, generally, are the result of undesirably high rms values within the load current.

SUMMARY OF THE INVENTION

The present invention relates to a device for current regulation, and sensitivity control means therefore, said device including a load through which the current to be regulated normally passes, comprising: (a) a normally-open electro-magnetically actuated relay proximately disposed to said load in order to sense a predetermined current level therein; (b) means for adjusting said predetermined current level, said means electrically connected to said relay; and (c) electronic switching means connected to said relay, said switching means comprising means for cutting-off the load current when said predetermined current level is sensed by said relay, whereby the load current will be restored when said current decays sufficiently to enable the armature of said relay to return to its normally open position.

It is an object of the present invention to provide an improved device for sensing and regulating the DC current through a load.

It is a further object to provide an improved method and apparatus for controlling the DC current through a load by more closely averaging the load current, thereby reducing heating of such load and increasing component life.

A yet further object of the present invention is to provide an improved DC circuit controller for regulating the speed of a motor operated by a battery or other DC source.

Still another object is to provide an improved current conrol circuit, particularly suitable in personnel carrier vehicle drives.

Yet further objects will become apparent from the hereinafter set forth detailed description of the invention, taken in combination with the drawings and the claims affixed herewith.

DETAILED DESCRIPTION OF THE INVENTION

A central element in the present invention is a current actuated relay. The armature of said relay is actuated by a magnetic field. The current level of actuation is adjusted by varying the number of ampere-turns required in order to effect closure of the armature. Such variation of the effective number of ampere-turns may be accomplished in any of the following ways:

1. Position adjustment of the armature with respect to the field.
2. Position adjustment of the field with respect to the armature.
3. Insertion of a ferrous material in the magnetic field to thereby increase the effect of the field, thus reducing the current required to accomplish actuation of the relay.
4. Alteration in the number of turns in the actuating coil.
5. Biasing the actuating coil by use of a second coil disposed about the armature in a direction so as to, selectively and in accordance with the desired application, oppose or assist the field produced by the flow of the load current through the actuating coil. And,
6. Variation in the tension of the armature contact, thereby selectively increasing or decreasing the field required to actuate the relay.

It is to be appreciated that by varying the current level required to actuate the relay, using any of the above methods, control of the load current can be accomplished by turning on or off of a switching circuit placed in electrical connection with the load. Through this approach, the level of the load current can be regulated about a predetermined current level.

Figure 1:
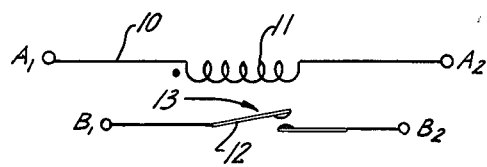
FIG. 1 is a schematic diagram illustrating, generally, the principle upon which the current level detecting means operates.

Referring now to FIG. 1, there is illustrated a load-current carrying conductor 10 having terminals $A_1$ and $A_2$ between which load current flows. Connected in series with conductor 10 is coil 11 disposed in proximity to the armature 12 of switch 13. Switch 13 is connected in series between output terminals $B_1$ and $B_2$. In a preferred embodiment of the invention, switch 13 is a single pole, single throw reed switch. Current of a predetermined level flowing between terminal $A_1$ and terminal $A_2$ will induce a magnetic field around coil 11 and cause armature 12 of the normally open switch 13 to close. The current level at which armature 12 will close may be pre-selected by any one of the methods enumerated hereinabove, such as changing the position of the armature with respect to the field, inserting a ferrous material within the field, or biasing the load coil with an additional coil. When the current flowing in conductor 10 drops below the aforesaid predetermined level, armature 12 will once again assume the open position. It can thus be seen that the load current flowing in conductor 10 can be regulated around a predetermined set level by the opening and closing of armature 12 through the magnetic field about coil 11.

Figure 2:
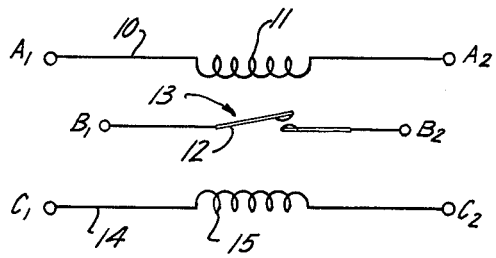
FIG. 2 is a schematic diagram depicting the use of a bias or control coil in conjunction with the circuit shown in FIG. 1.

Referring now to FIG. 2, there is shown the basic current sensing device of FIG. 1 with the addition of a bias or control coil 15 connected between terminals $C_1$ and $C_2$ by conductor 14. Coil 15 is disposed in relation to coil 11 in a manner such that current flowing in conductor 14 and through coil 15 will either boost or buck the field induced around coil 11. When coil 15 is wound in boosting relationship to coil 11, less load current will be required to close armature 12 of switch 13 and, conversely, when coil 15 is would so as to oppose or buck the field around coil 11 greater load current will be required to close the switch.

Figure 3:
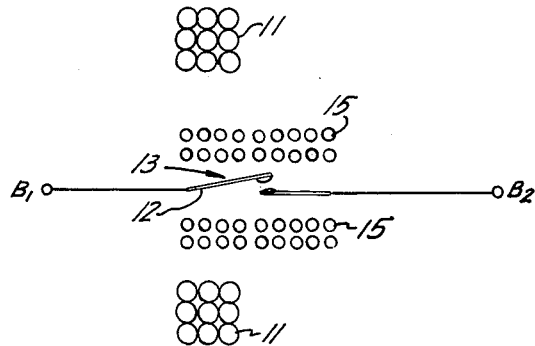
FIG. 3 is a cross-sectional representation of a preferred physical relationship among the elements schematically shown in FIG. 2.

In FIG. 3, the physical arrangement of coils 11 and 15 with respect to switch 13 and armature 12 are shown schematically in FIG. 2 and is depicted in cross-section. In the particular example chosen, the load coil has a relatively low number of turns while the control or bias coil has a high number of turns.

Figure 4:
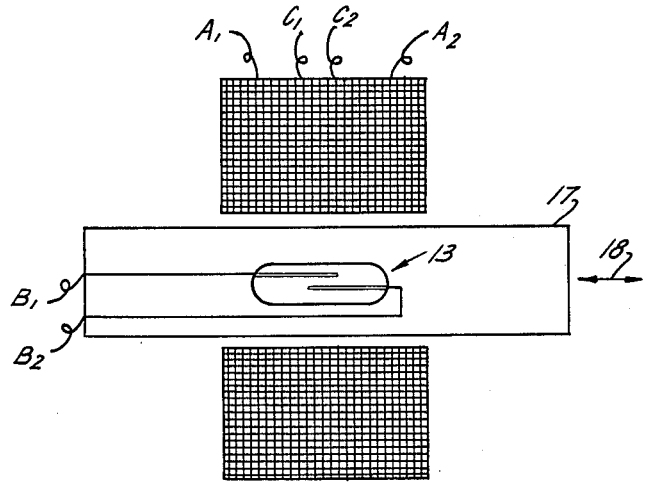
FIG. 4 illustrates, in further detail, a preferred physical arrangement of the elements depicted in FIGS. 2 and 3 in which the relay is movable with respect to the magnetic field of the control coil.

FIG. 4 depicts one possible physical construction of the elements shown schematically in FIGS. 2 and 3. Coil 11 is connected between terminals $A_1$ and $A_2$ and is disposed within support 16, while coil 15 is also disposed within support 16 and is connected between terminals $C_1$ and $C_2$. The physical relationship of coils 11 and 15 to each other and to armature 12 of switch 13 is that shown in FIG. 3. Reed switch 13 is connected between terminals $B_1$ and $B_2$ and is slidably mounted in support 16 by means of slide 17 so that the position of armature 12 with respect to coils 11 and 15 may be adjusted by reciprocal movement of slide 17 in the direction of arrows 18. This adjustment may be performed manually, as by means of a control knob or the like.

Figure 5A:
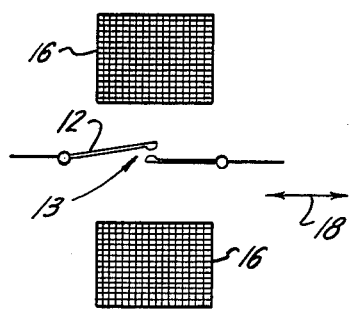
FIGS. 5A and 5B illustrate two possible positions of the relay with respect to the magnetic field produced by the control coil—one position adapted for minimum current actuation and the second adapted for maximum current actuation.
Figure 5B:
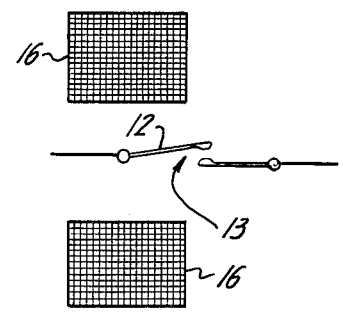

Two possible positions of armature 12 with respect to the coils 11 and 15 are shown in FIGS. 5A and 5B, to wit, FIG. 5A shows switch 13 adjusted in the direction of arrows 18 with respect to coils 11 and 15 so that it lies in the center of the field generated by the coils. In this position minimum load current flowing through the coils will close armature 12. In the position of switch 13 shown in FIG. 5B, wherein it lies at the extreme periphery of the field generated by the coils, maximum load current flowing through the coils will be required to close armature 12.

Figure 6:
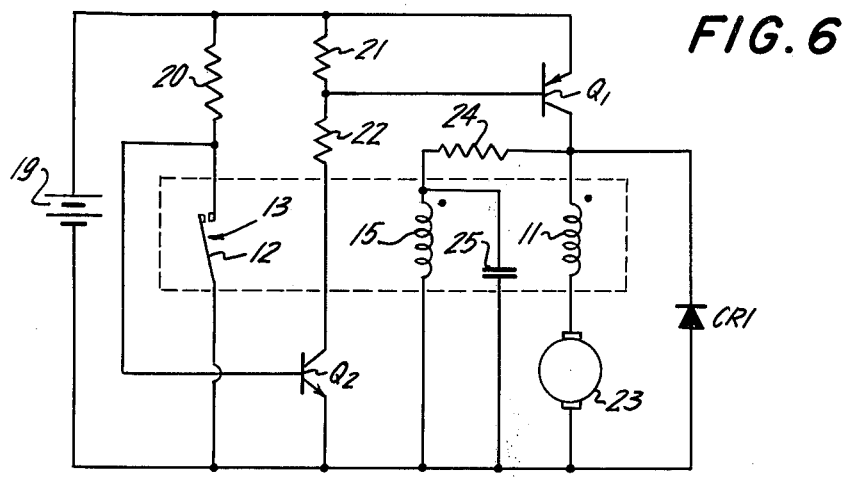
FIG. 6 is a circuit diagram of a DC motor control circuit exhibiting the principles of the present invention.

The above-discussed principles of operation and construction are shown combined in a practical DC motor control in FIG. 6. As shown therein, armature 12 of switch 13 is normally open and in this position driver transistor $Q_2$ is normally conductive through the bias provided from DC source 19 through resistor 20. Transistor $Q_2$ drives transistor $Q_1$ causing it in turn to conduct through the circuit including resistors 21 and 22. With transistor $Q_1$ conducting, current will flow through load coil 11 and the armature of motor 23, as well as through resistor 24 and control coil 15. Current flowing through $Q_1$ will start to increase after the transistor initially commences conducting, and at a predetermined current level, as described hereinabove, armature 12 of switch 13 will close. This predetermined current level, as previously described in the preferred embodiment of the invention, will be determined by adjusting the position of armature 12 with respect to coils 11 and 15.

Figure 7:
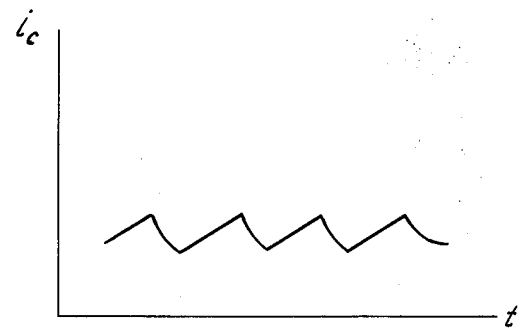
FIG. 7 is a current wave form which will flow through the load coil of a motor utilizing the present invention.

When armature 12 closes, the base drive of transistor $Q_2$ will be turned off, causing the transistor to cease conducting and the current through it to be cut off. Transistor $Q_1$ will consequently also be cut off, but inductive motor current will continue to flow through shunt rectifier $CR_1$ and back through loal coil 11. This current will decay sufficiently to permit armature 12 to once again assume its open position and transistors $Q_2$ and $Q_1$ will commence conducting again. Thus, full current will again flow from DC source 19 through transistor $Q_1$ and the armature of motor 23, and the above-described process will repeat itself cyclically as is depicted in FIG. 7. The load current flowing through the armature and load coil 11 will thus be closely averaged around the predetermined current sensing level. Capacitor 25 is connected in parallel with control coil 15 in order to provide averaging of the feedback current through coil 15.

As the back EMF of motor 23 increases with increasing motor speed, average current through control coil 15 will increase. As shown in FIG. 6, control coil 15 is wound in such a manner as to aid the magnetic field produced by load coil 11. Thus the increase in current through control coil 15 will reduce the load current necessary to cause armature 12 to close, causing the load current to decay and motor speed to diminish in the manner described hereinabove. In this way, speed regulation of DC motor 23 is obtained.

While the invention has been described with specific reference to DC motor speed and current control, it should be realized that it could equally well be used in other environments wherein a precise control of load current is desired. Further, although the use of reed switches as the current sensing element has been described, other circuit components which are sensitive to changes in current could also be used.

Accordingly, while there have been shown and described the preferred embodiments of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

Having thus described our invention what we claim as new, useful and non-obvious and, accordingly, secure by Letters Patent of the United States is:

1. A device for current regulation, and sensitivity control means therefore, said device including a load through which the current to be regulated normally passes comprising:
   (a) a normally open electro-magnetically actuated relay including an armature movable in response to a magnetic field generated by current flow through a load coil actuated by its proximity to said load in order to sense a predetermined current level therein;
   (b) means for adjusting said predetermined current level, including a second coil, bias wound with respect to said load coil, to vary the current required to produce a magnetic field of sufficient strength to move the armature of the relay to a closed position, and a capacitor in parallel connection with said coil to provide an averaging of the inductive motor current through said second coil and to obtain fine sensitivity control over armature actuation, said means electrically connected to said relay; and
   (c) electronic switching means connected to said electro-magnetically actuated relay, said switching means comprising means for closing said relay and thereby cutting off the load current when said predetermined current level is sensed by said electro-magnetically actuated relay,
   so that the load current will be restored when said current decays sufficiently to enable the armature of said electro-magnetically actuated relay to return to its normally open position.

* * * * *